Patented June 18, 1946

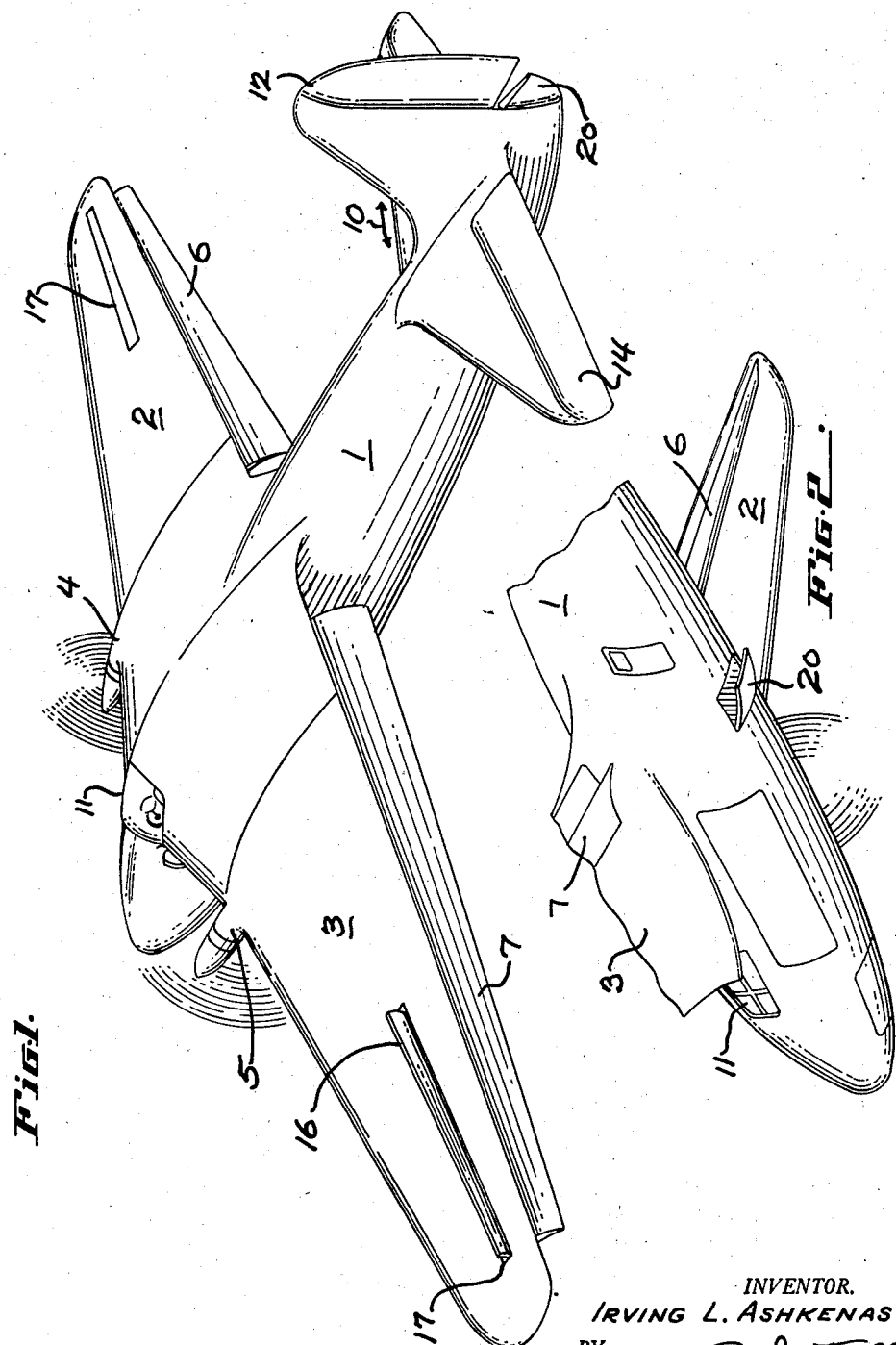

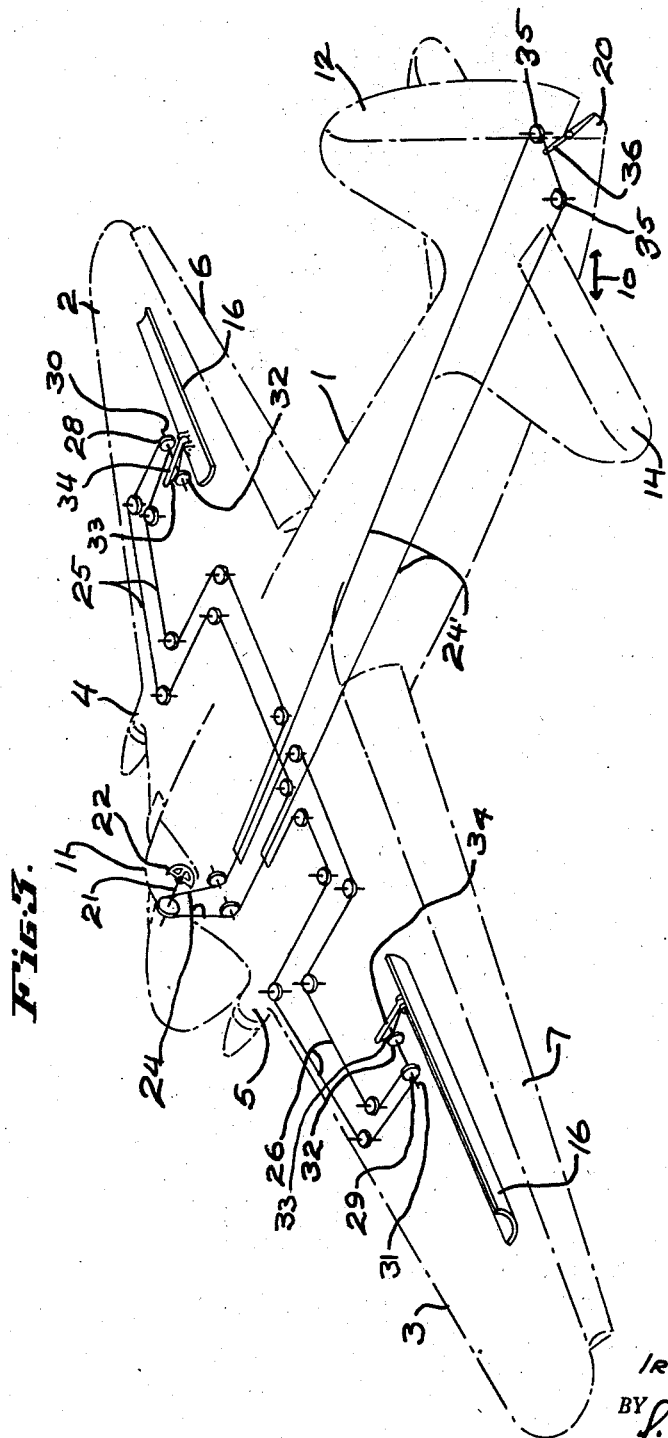

2,402,118

UNITED STATES PATENT OFFICE 2,402,118

ROLL CONTROL FOR AIRPLANES

Irving L. Ashkenas, Los Angeles, Calif., assignor to Northrop Aircraft, Inc., Hawthorne, Calif., a corporation of California Application December 22, 1941, Serial No. 423,882

5 Claims. (Cl. 244—90)

My invention relates to airplanes, more particularly to airplane control with particular reference to a system for efficiently controlling rolling movements of airplanes by the use of movable spoiler surfaces.

My invention is particularly advantageous for use in conjunction with wings utilizing flaps for increasing the maximum lift for landing and takeoff purposes.

The objects of my invention are: To provide a roll control system for an airplane wing which permits the use of substantially full-span flaps; to provide a rolling control for airplanes which does not interfere with the most efficient utilization of landing flaps; to provide a variable lift structure for controlling roll in an airplane which operates without appreciable time lag, and which is provided with aerodynamic restoring forces; to provide a means and method of supplying areodynamic restoring forces to movable spoiler surfaces utilized for roll control, when such surfaces alone have only a slight positive, or negative restoring force; to provide a roll control giving approximately uniform control for all attitudes within the flying range; to provide a spoiler-type roll control, effective without substantial time lag at both high and low speed attitudes of an airplane; to provide a spoiler-type aileron located in the aft portion of an airplane wing, sufficiently powerful to provide substantially all of the required roll control at all speeds; to provide a spoiler-type aileron having only a slight positive or even negative restoring force, operated in conjunction with an aerodynamic surface having a large positive restoring force when deflected, and to provide a simple spoiler-plate aileron system having an overall positive neutralizing force so that the controls will return to neutral when released by the pilot.

In the drawings:

Fig. 1 is an external perspective view from above of an airplane showing the disposition of the control surfaces of my invention in one preferred form.

Fig. 2 is a similar view from below illustrating another embodiment of my invention.

Fig. 3 is a diagrammatic view showing a control linkage for the rolling control system illustrated in Fig. 1.

My invention utilizes upper wing surface spoiler-type ailerons comprising a surface or series of surfaces which by extension through or above the upper surface contour of a wing causes a reduction in the lifting force. This reduction in lift, when applied to half of a complete airplane wing, results in a rolling moment which, provided the pilot can conveniently regulate it, will supply the required roll control for the airplane.

It will be readily understood, however, that under ordinary circumstances, the pilot forces needed to control such a surface may be either so high as to be outside the possibility of human attainment, necessitating the introduction of some external source of power; or so low that there is no personal feel attendant to any movement of such surface, nor any tendency for the surfaces to return to neutral position, upon release of the controls by the pilot. In fact, the aerodynamic forces on such surfaces may often be negative and such that the surfaces tend to extend of their own accord, and pilot force must therefore be applied to restrain extension. In any such case, i. e., where the aerodynamic forces on the system are too light, or act in the wrong direction, I have found that a separate aerodynamic balancing surface can be utilized in the system to increase the required pilot force and to create an overall positive restoring force so that the control column will return to neutral when released. I have further found that when spoiler surfaces are placed in the aft 40% of the wing, i. e., 60% or more of the chord length back from the leading edge of the wing, the time lag of response, when such surfaces are extended from the main wing contour, is completely satisfactory at all speeds and at all flying attitudes, being in the neighborhood of .1 second for average cruising conditions, whereas with spoilers located ahead of this region the time lag of response becomes excessive, reaching values of .3 second or more.

Furthermore, by utilizing the region of the wing to the rear of the 60% chord point, it is possible to select a location for the spoilers sufficiently far forward of the trailing edge of the wing to clear the landing flap and its associated mechanism, making it possible to use a full span landing flap, inasmuch as none of the trailing edge need necessarily be utilized for any part of the aileron control. By the use of the term "full span flaps" however, I do not wish to indicate that it is at all times necessary to utilize the entire span for the flap, but merely indicate that the term implies that substantially all of the span is available for flap installation if required.

Broadly therefore, my invention, as to method, involves the use of a separately obtained aerodynamic restoring force applied to balance, to overcome, or to combine with the aerodynamic forces attendant to movements of upper-surface spoiler-type ailerons, to the end that irrespective of the character of the spoiler plate forces, the entire system will neutralize itself when released by the pilot, thus providing a personal pilot feel to the system, similar to that provided in an ordinary trailing edge aileron system.

Broadly as to apparatus, my invention comprises a pair of spanwise extending spoiler surfaces positioned near the outer ends of the wings aft of the 60% chord point and adapted to be selectively extended above the upper surface of either wing to disrupt the smooth flow of air over the wing contour and thereby cause a loss of lift on that wing, producing a rolling moment on the airplane. An additional surface is provided which is operatively connected to the spoiler control system and which is acted upon by aerodynamic forces whenever one of the spoilers is extended, producing a positive restoring force in the control system tending to centralize the controls against the pilot force, even though the aerodynamic forces on each spoiler surface be such that the surface tends to extend of its own accord.

My invention may be more fully understood by direct reference to the drawings, which show a conventionalized airplane embodying two typical modifications of my invention.

Referring first to Figs. 1 and 3 showing external views, each of the airplanes comprises a fuselage 1 having laterally extendings wings 2 and 3, and provided with motor nacelles 4 and 5. Wings 2 and 3 are provided with substantially full span landing flaps 6 and 7 respectively of any well known type shown in extended position.

Fuselage 1 is provided with the conventional tail surfaces 10 at the rear thereof, and the pilot cockpit 11 at the front thereof. The plane is therefore controlled in direction by rudder 12 and in pitch by elevators 14.

Roll control, in accordance with my invention, is preferably provided by the use of spoiler-plates 16 extendable upwardly from the upper surface of each wing adjacent the outer end thereof. These spoiler-plates are preferably concave in the direction of flight and operate from within the wing sections to project through slots 17 in the wing surface as desired. The spoiler-plates are positioned to extend above the wing surface adjacent the end of the wing, in the rear 40% of the upper wing surface, i. e., aft of the 60% chord point, and forward of the trailing edge of the wing sections.

In Figure 1 the left spoiler-plate is shown extended, and the right spoiler-plate is shown withdrawn within the wing. In this modification of my invention, the spoiler-plates 16 may have aerodynamic forces acting upon them to extend them, i. e., a negative restoring force. In order to provide a positive restoring force, I desire to utilize an additional movable aerodynamic surface 20 which in this instance may be positioned to operate on a vertical hinge line coextensive with the hinge line of the rudder 12. As this surface 20 is moved either way from center, aerodynamic forces acting upon it will tend to recenter it. One form of linkage by which the aerodynamic forces acting upon the spoiler-plates 16 may be balanced or over compensated by the aerodynamic forces acting upon surface 20 is shown diagrammatically in Fig. 3.

Here the pilot's column 21 is provided with a conventional control wheel 22, rotatable exactly as for normal aileron control to move in either direction a spoiler-plate cable 24. The two ends of the spoiler-plate cable 24 are divided, with branches 25 and 26 led outwardly in wing sections 2 and 3 respectively, these branches joining around spoiler-plate pulleys 28 and 29 respectively. Pulley 28 is mounted on right spoiler-plate shaft 30, and spoiler-plate pulley 29 is mounted on left spoiler-plate shaft 31. Each spoiler-plate shaft carries a link pulley 32, around which is wrapped a link cable 33 attached to opposite ends of a spoiler plate arm 34, pivoted to the adjacent spoiler-plate. Rotation of shafts 30 or 31 slides the spoiler-plates in or out of slots 17 in accordance with the direction of shaft rotation, in guides, not shown.

The spoiler-plate linkage system is adjusted to extend one spoiler-plate above the upper surface of the wing section in which it is mounted, from a neutral position slightly inside the wing slots 17 as desired, such extension of one spoiler-plate withdrawing the opposite spoiler-plate further within the wing. The linkage has been simplified for purposes of illustration, and it will be obvious to those skilled in the art that differential linkage can be provided so that while one spoiler-plate is being extended above the surface of one wing section, the top edge of the other spoiler-plate can be made to remain level with the upper wing surface to at least partially close the slot therein. This linkage, however, is no part of the present invention.

The system described above will give complete roll control for the airplane. However, as has been stated above, spoiler-plates when extended above the upper surface of the wing section in which they are mounted, have little or no restoring force tending to return them within the wing, but will in point of fact, in most cases have a tendency to extend further, thus requiring a pilot to exert force to prevent such extension. Such an application of force by the pilot is contrary to the normal feel of aileron systems and leaves the sytsem out of balance in case of pilot neglect. Consequently I link surface 20, positioned in the normal rudder plane, with the spoiler-plate linkage system as just described.

Such an interlinkage is provided by cables 24' forming extensions of the ends of cable 24. Cables 24' pass longitudinally through the fuselage to the tail, around actuating pulleys 35 to which a lever arm 36 is attached, this lever arm also being attached to surface 20 inside of the fuselage.

The size of surface 20 can easily be regulated to provide any positive restoring force desired to the spoiler-plate cable system. Under the condition shown in Fig. 3 with the left spoiler-plate extended, and having for example, a negative restoring force, the auxiliary surface 20 will be turned to the left providing a positive restoring force to the system. The size of surface 20 is designed to give an overall positive restoring force to the entire system. Likewise, when the right spoiler-plate 16 is extended, the auxiliary surface 20 will be turned to the right and will again provide an overall positive restoring force. If the pilot should completely release wheel 22 it will be seen that the auxiliary surface 20 will tend to centralize itself in the plane of the rudder and will by virtue of its positive restoring force, retract whichever spoiler-plate might at the time be extended.

Desirable ailerons should not only provide adequate roll control but, further, have no tendency to yaw the airplane in a direction unfavorable to the execution of a normal banked turn. It should be pointed out, in this respect, that one of the characteristics of spoilers used as ailerons is that they tend to produce a favorable yawing moment due to the increased drag of the protruding spoiler on the side of the lowered wing, and that this favorable yawing moment is augmented by the action of a surface 20 operating around the hinge-line of the rudder, the extent of such additional yawing moment being a function of the area of the surface and the amount of its deflection.

However, it is obviously not necessary for the auxiliary surface 20 to rotate around the rudder hinge-line. In fact there is no particular position of the auxiliary surface required. In Fig. 2 I have shown for example, the auxiliary surface positioned at the bottom of the fuselage preferably in a region of positive pressure, the surface deflecting with respect to the fuselage, when either of the spoiler-plates are extended. Such an arrangement adds only a slight amount of drag to the plane, and the aerodynamic forces are utilized to centralize the spoiler-plates with a linkage moving the surface 20 outwardly when either spoiler-plate is extended. Other positions of the auxiliary surface 20 will be readily apparent to those skilled in the art, as the surface 20 may be positioned practically anywhere where the restoring moment thereof, when deflected from some neutral position, is positive, and the overall effect of such a deflection on the forces acting on the airplane is negligible.

It is apparent that, for the surfaces described, the neutral position of the spoiler ailerons must coincide with the "floating angle" of the auxiliary surface. This "floating angle" may be regulated by the use of conventional trim tabs or may be eliminated from consideration by the use of two similar auxiliary surfaces, each moving in opposite directions. In the latter case the restoring force of the auxiliary system is obtained in the same way and is practically identical in characteristics to that of an ordinary aileron system.

Summarizing, my invention comprises the following elements:

1. A spoiler-type aileron having either a low positive or a negative restoring force, located in the aft portion of each wing and clear of the trailing edge thereof, sufficiently powerful when projected above the upper wing surface contour to provide all or substantially all of the required rolling control at all speeds and attitudes.

2. A hinged flap positioned to have a large positive aerodynamic restoring force when deflected, and which may or may not contribute to the rolling moment.

3. A suitable control mechanism so combining the action of the above elements that the restoring force caused by projection of an aileron for producing a rolling moment, is accompanied by the restoring force due to a related deflection of the flap to give an overall positive restoring force to the system in the absence of pilot control.

I claim:

1. A roll control system for airplanes comprising a spoiler member extensible above the upper surface contour of each wing adjacent the outer end thereof and having aerodynamic restoring forces ranging from low positive to a negative value, control means connected to said member for differentially extending and retracting said members at will, a flap hinged to said airplane and positioned to have an aerodynamic restoring force when deflected, and means for connecting said flap to said control means to impose positive restoring force to said spoiler members and control means sufficient to centralize the system in the absence of pilot control.

2. Apparatus in accordance with claim 1 wherein said flap is positioned to have a favorable aerodynamic yawing moment.

3. Apparatus in accordance with claim 1 wherein said flap is positioned in a region of positive pressure on said airplane.

4. A roll control system for an airplane having a wing, comprising an extensible pilot controllable spoiler member in a tip portion of said wing and having a low positive to negative restoring force when extended from an initial rest position, deflectable means on such airplane coupled to said spoiler member and exposable, when deflected, to a positive aerodynamic restoring force sufficient to overcome all negative restoring forces in said control system and establish an overall positive restoring force, whereby to automatically restore said spoailer member to its initial rest position, in the absence of pilot control.

5. A roll control system for an airplane having a wing, comprising an extensible pilot controllable spoiler member in said wing designed to have a low positive to negative aerodynamic restoring force, movable means on said airplane adapted to be deflected from a normal position, said means being subject to aerodynamic forces tending to restore it to said normal position when it has been deflected, and an interconnection between said means and said spoiler member operative to deflect said means when said spoiler member is extended, the aerodynamic restoring force of said means being sufficient to overcome any negative restoring force of said spoiler member so as to provide said member with overall positive restoring force that will retract said member in the absence of pilot control.

IRVING L. ASHKENAS.